(12) United States Patent
Kubota et al.

(10) Patent No.: US 9,664,239 B2
(45) Date of Patent: May 30, 2017

(54) HIGHLY REACTIVE FLUID FAN CLUTCH DEVICE

(71) Applicant: USUI KOKUSAI SANGYO KAISHA LIMITED, Shimizu-cho, Sunto-gun, Shizuoka (JP)

(72) Inventors: Satoshi Kubota, Shimizu-cho (JP); Yohei Takahashi, Shimizu-cho (JP)

(73) Assignee: USUI KOKUSAI SANGYO KAISHA LIMITED (JP)

( * ) Notice: Subject to any disclaimer, the term of this patent is extended or adjusted under 35 U.S.C. 154(b) by 114 days.

(21) Appl. No.: 14/687,167

(22) Filed: Apr. 15, 2015

(65) Prior Publication Data

US 2015/0330463 A1 Nov. 19, 2015

(30) Foreign Application Priority Data

May 19, 2014 (JP) .................. 2014-103779

(51) Int. Cl.
*F16D 31/00* (2006.01)
*F16D 35/02* (2006.01)

(52) U.S. Cl.
CPC .................. *F16D 35/024* (2013.01)

(58) Field of Classification Search
CPC .................................................... F16D 35/024
See application file for complete search history.

(56) References Cited

U.S. PATENT DOCUMENTS

| | | | |
|---|---|---|---|
| 4,246,995 A | 1/1981 | Gee | |
| 4,281,750 A | 8/1981 | Clancey | |
| 7,387,591 B2 | 6/2008 | Shiozaki | |
| 2006/0272918 A1* | 12/2006 | Shiozaki | F16D 35/024 192/58.61 |
| 2007/0095627 A1* | 5/2007 | Hagiwara | F16D 35/024 192/58.61 |
| 2009/0064946 A1 | 3/2009 | Schultheiss et al. | |

(Continued)

FOREIGN PATENT DOCUMENTS

| | | |
|---|---|---|
| DE | 102006008576 | 8/2007 |
| EP | 0010378 | 4/1980 |

(Continued)

OTHER PUBLICATIONS

European Patent Appl. No. 15165524.8—extended European Search Report issued Sep. 21, 2015.

*Primary Examiner* — David J Hlavka
(74) *Attorney, Agent, or Firm* — Gerald E. Hespos; Michael J. Porco; Matthew T. Hespos

(57) ABSTRACT

Provided is a highly reactive fluid fan clutch device excellent in reaction speed of fan rotation to a control signal even with a weak centrifugal force during low fan rotation. The device of an external control type includes: an annular oil reserving chamber provided in a case that is supported by a rotary shaft having a drive disk fixed thereto; and a valve member for opening and closing an oil circulating flow passage hole of the annular oil reserving chamber by an electromagnet, wherein an effective oil contact area at a torque transmission gap formed between a drive side and a driven side is increased and decreased to control rotation torque transmission from the drive side to the driven side, and an inner wall eccentric to an outer wall of the annular oil reserving chamber is provided in the annular oil reserving chamber.

2 Claims, 2 Drawing Sheets

(56) References Cited

U.S. PATENT DOCUMENTS

2012/0279820 A1* 11/2012 Hennessy ............. F16D 35/024
    192/58.4
2015/0184702 A1* 7/2015 Schmidt .................. F16D 35/00
    192/58.8

FOREIGN PATENT DOCUMENTS

| EP | 0015643 | 9/1980 |
|----|---------|--------|
| JP | 63-21048 | 1/1988 |
| JP | 2002-81466 | 3/2002 |
| JP | 2006112466 | 4/2006 |

* cited by examiner

HIGHLY REACTIVE FLUID FAN CLUTCH DEVICE

CROSS REFERENCE TO RELATED APPLICATIONS

The present application claims priority to Japanese Patent Application No. 2014-103779 filed on May 19, 2014, the entire contents of which are incorporated by reference herein.

BACKGROUND

1. Field of the Invention

The present invention relates to a fluid fan clutch device of a type in which fan rotation for engine cooling generally in an automobile or the like is controlled according to a change in external ambient temperature or rotation and, in more detail, relates to a highly reactive fluid fan clutch device for improving quickness of reaction of fan rotation to a control signal.

2. Description of the Related Art

Conventionally, as a fan clutch device for controlling fan rotation for engine cooling in an automobile or the like to supply an amount of cooling blast to the engine, there are a temperature-sensitive type, an external control type, and the like. The temperature-sensitive type includes an example of a fan clutch in which: the inside of a sealed housing composed of a case and a cover is partitioned into an oil reserving chamber and a torque transmission chamber that has a drive disk incorporated therein, by a partition plate having an oil supply adjusting hole; a dam for collecting and reserving oil during fan rotation is provided on a part of an inner circumferential wall on a side of the sealed housing facing an outer circumferential wall part of the drive disk; an oil circulating flow passage continuing from the dam is provided between the torque transmission chamber and the oil reserving chamber; a valve member is included inside, the valve member opening the supply adjusting hole of the partition plate when the temperature of external ambient or the like exceeds a set value and closing the supply adjusting hole of the partition plate when the temperature is equal to or lower than the set value; and an effective contact area of oil in a torque transmission gap provided between the drive disk and an opposite wall face near the outside of the sealed housing is increased/decreased to control torque transmission from a drive side toward the sealed housing on a driven side. A fan clutch device of this type generally detects an atmospheric temperature using a bimetallic strip or a bimetallic coil, thereby adjusting the opening degree of the oil supply adjusting hole according to the detected value (see Japanese Patent Publication No. S63-21048). For the external control type, while the basic structure thereof is similar to that of the temperature-sensitive fan clutch device, a valve member for opening and closing the oil supply adjusting hole of the partition plate is made of a magnetic material, and the magnetic valve member is controlled by an electromagnet provided externally. An example of this structure is such that a pair of electromagnets are provided on a front or rear face side of the sealed housing and the magnetic valve member for opening and closing the oil supply adjusting hole of the partition plate is provided opposite the electromagnets (see Japanese Patent Publication No. S63-21048).

Furthermore, a viscous friction clutch of an external control type for driving a cooling fan of a vehicle has been known. The viscous friction clutch is characterized by, for example, including: a drive disk and a housing (a case and a cover); an annular supply chamber and a working chamber; and a device for supplying a shear fluid (oil) from the supply chamber into the working chamber and a device for returning the shear fluid from the working chamber to the supply chamber, part of the supply chamber including a storage chamber for the shear fluid, the storage chamber being separated from the working chamber by another part of the supply chamber, the supply chamber being provided inside the housing, the storage chamber comprising an annular segment formed as a supplementary receptacle, the supply chamber including at least one supply bore and at least one return bore (collection port), and the supply and return bores forming part of the devices for supplying and returning the shear fluid. In the external control type fan clutch device having these configuration, viscous oil flowing out from the supply bore on the case or cover side of the housing is supplied to torque transmission units (labyrinth units) provided on the drive disk and the case and the cover of the housing due to a centrifugal force occurred during fan clutch rotation.

In the conventional fan clutch devices disclosed in Japanese Patent Publication No. S63-21048 and Japanese Patent Application Laid-Open No. 2002-81466, the oil supply adjusting hole that the valve member opens and closes is provided on the driven side because of the configuration where the drive torque of the drive disk is transferred to the sealed housing (case) by the oil supplied from the oil reserving chamber to the torque transmission chamber through the oil supply adjusting hole of the partition plate and thereby rotating a fan mounted on the sealed housing. Thus, the conventional fluid fan clutch device of this type has a disadvantage that the centrifugal force during low fan rotation (OFF rotation) is weak and the supply amount of oil is decreased accordingly, which leads to slow reaction when the fan rotation increases, and at a result, it disadvantageously takes time to rotate the fan at high speed. Moreover, for a snowplow (a vehicle with a moldboard for snowplowing provided in front of a front grille), air velocity on the front face of the front grille is slower than its peripheral air velocity, and then a difference in pressure occurs between the inside of the engine room and the periphery of the front grille, or the flow of wind in a direction opposite to the fan occurs by swirled-up wind from under the floor. With this, rotation of the fan becomes significantly decreased, thereby disadvantageously slowing down or inhibiting the reaction when the fan rotation increases to prevent an increase in rotation of the fan to cause overheat.

Still further, a fluid fan clutch device of an external control type has been known in which viscous oil flowing out from the supply bore on a case or cover side of a housing is supplied to a torque transmission units (labyrinth units) provided on a drive disk and the case and the cover of the housing due to the centrifugal force occurred during fan clutch rotation. Since this type of fluid fan clutch device has the supply bore on the driven side, the centrifugal force becomes weaker at the time of low fan rotation (OFF rotation), and the supply of the viscous oil also becomes weak accordingly, thereby disadvantageously causing slow reaction of fan rotation to a control signal.

SUMMARY OF THE INVENTION

The present invention is intended to provide a highly reactive fluid fan clutch device in which reaction of fan rotation to a control signal is quick even with a weak centrifugal force during low fan rotation and a pressure necessary for supply can be obtained with a small amount of oil by solving these disadvantages found in the fluid fan clutch device of the external control type, as described above, in which viscous oil flowing out from the supply bore on the case or cover side of the housing is supplied by the centrifugal force occurred during rotation of the fan clutch to the torque transmission units (labyrinth units) provided on the drive disk and the case and the cover of the housing, that is, the centrifugal force becomes weaker at the time of low fan rotation (OFF rotation), and the supply of the viscous oil also becomes weak accordingly, thereby disadvantageously causing slow reaction of fan rotation to the control signal.

According to the present invention, the highly reactive fluid fan clutch device of an external control type includes: a torque transmission chamber with a drive disk incorporated therein and provided in a sealed housing composed of a nonmagnetic case and a cover mounted on the case, the case and the cover being supported via bearings on a rotary shaft with the drive disk fixed thereto; at least one oil circulating flow passage hole communicating with a torque transmission gap and provided on a side wall of an annular oil reserving chamber formed by a hollow in the case; a magnetic valve member for opening or closing the oil circulating flow passage hole, the valve member having an armature attached to a leaf spring mounted on the case; and an electromagnet supported on the rotary shaft via a bearing, wherein opening and closing of the oil circulating flow passage hole is controlled by the valve member actuated by the electromagnet, and rotary torque transmission from a drive side to a driven side is controlled by increasing and decreasing an effective contact area of oil in the torque transmission gap formed between the drive side and the driven side, and an inner wall eccentric to an outer wall of the annular oil reserving chamber is provided in the annular oil reserving chamber.

The highly reactive fluid fan clutch device according to the invention allows oil to be supplied by increasing the oil pressure that is applied to the oil circulating flow passage hole provided on the side wall face of the oil reserving chamber even when the centrifugal force is weak at the time of low fan rotation, due to the action of the inner wall eccentric to the outer wall of the annular oil reserving chamber in the oil reserving chamber. Therefore, it is possible to achieve effects that reaction of fan rotation to control signal is quick even with a weak centrifugal force during low fan rotation and a pressure necessary for supply can be obtained with a small amount of oil, thereby possibly contributing to cost reduction.

DETAILED DESCRIPTION

Figure 1:
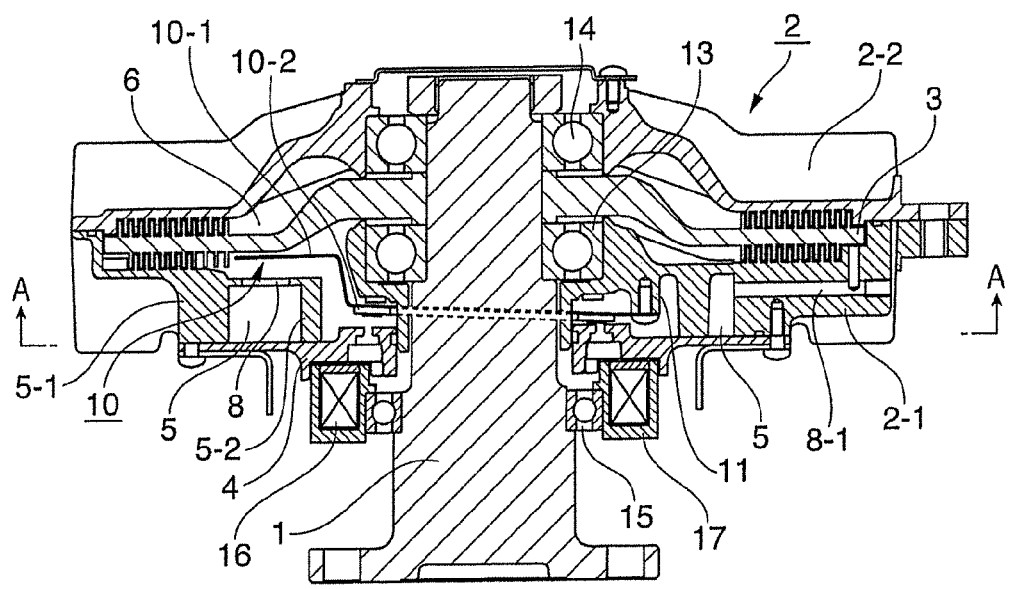
FIG. 1 is a longitudinal cross-sectional view showing an embodiment of a highly reactive fluid fan clutch device of an external control type according to the present invention.
Figure 2:
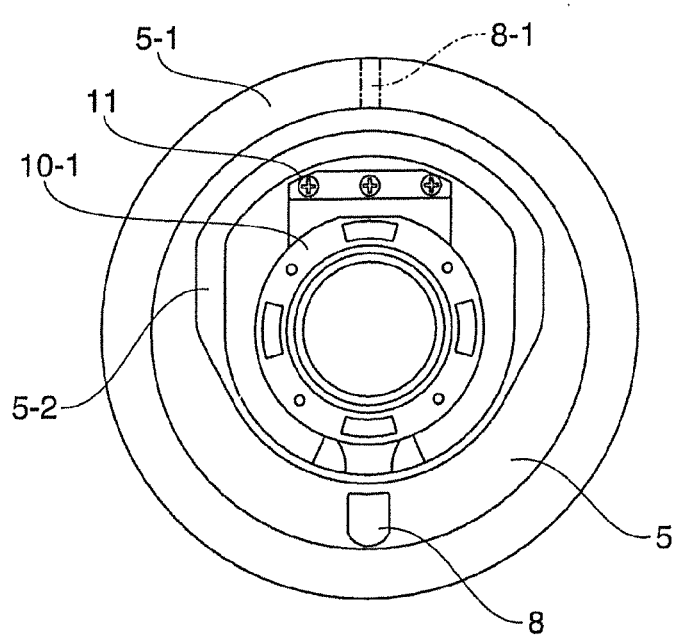
FIG. 2 is a sectional view taken along an arrowed line A-A in FIG. 1.

In a highly reactive fluid fan clutch device of external control type depicted in FIG. 1 and FIG. 2, a sealed housing 2 composed of a case 2-1 and a cover 2-2 is supported via bearings 13 and 14 on a rotary shaft (drive shaft) 1 that rotates by driving of a drive unit (engine), and a drive disk 3 fixed to the rotary shaft 1 is incorporated in a torque transmission chamber 6 within the sealed housing 2. The case 2-1 is provided with an annular oil reserving chamber (oil storage chamber) 5 that has an outer wall 5-1 and an inner wall 5-2 with a hollow therebetween and is covered with a plate 4. The oil reserving chamber 5 is configured so that the inner wall 5-2 is eccentric to the outer wall 5-1. An outer wall 5-1 side of the oil reserving chamber 5 is provided with an oil circulating flow passage hole (oil supply bore) 8 communicating with the torque transmission chamber 6, and an oil recovery port 8-1. An oil supply valve member 10 for opening and closing the oil circulating flow passage hole 8 provided in the case 2-1 is composed of a leaf spring 10-1 and an armature 10-2, and a base end of the leaf plate 10-1 is fixed with a screw or the like to a fixed portion 11 of the valve member provided on a rear face side of the case 2-1 so that the armature 10-2 of the valve member 10 is positioned near the rotary shaft 1. On a driving unit side of the sealed housing 2, a ring-shaped electromagnet 16 is supported by a ring-shaped electromagnet support 17 that is supported via a bearing 15 to the rotary shaft 1. The electromagnet 16 causes the oil circulating flow passage hole 8 to be opened and closed by the action of the leaf spring 10-1 via the plate 4.

In the above-configured highly reactive fluid fan clutch device, when the electromagnet 16 is turned OFF (unexcited), the armature 10-2 is separated from the oil circulating flow passage hole 8 on the outer wall 5-1 side of the oil reserving chamber 5 by the action of the leaf spring 10-1 to open the oil circulating flow passage hole 8, thereby causing the oil reserving chamber 5 and the torque transmission chamber 6 to communicate with each other to supply oil in the oil reserving chamber 5 into the torque transmission chamber 6 and then causing a fan (not shown) for cooling to make a transition from a stop state to a rotating state. On the other hand, when the electromagnet 16 is turned ON (excited), the armature 10-2 is attracted against the leaf spring 10-1 to cause the leaf spring 10-1 to be pressed onto an oil reserving chamber 5 side to close the oil circulating flow passage hole 8, thereby preventing oil in the oil reserving chamber 5 from being supplied into the torque transmission chamber 6.

In the present invention, when the electromagnet 16 is turned ON, by the effect of the inner wall 5-2 provided to be eccentric to the outer wall 5-1 in the annular oil reserving chamber 5, the amount of oil near the oil circulating flow passage hole 8 is increased to intensify fluid head pressure (supply pressure). As a result, the supply amount of oil supplied into the torque transmission chamber 6 is increased. Therefore, according to the present invention, reaction of fan rotation to a control signal is quick even with a weak centrifugal force at the time of low fan rotation.

Examples of the present invention are described below.

The highly reactive fluid fan clutch device of an external type depicted in FIG. 1 and FIG. 2 was used to study reaction rates from normal OFF rotation (200 rpm to 250 rpm) state until torque transmission by exciting the electromagnet (oil viscosity: 12500 cst) as test conditions.

Figure 3A:
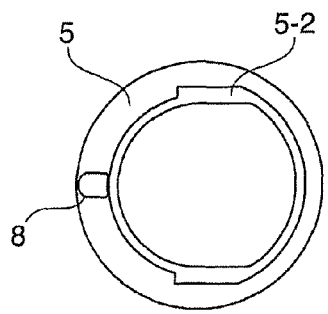
FIG. 3A is a schematic diagram of the embodiment of the present invention when the eccentric ratio of an inner wall to an outer wall of an oil reserving chamber is 60:40 (Example 1).
Figure 3B:
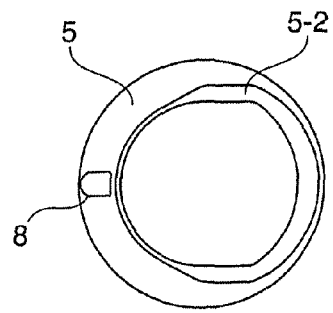
FIG. 3B is a schematic diagram of the embodiment of the present invention when the eccentric ratio of the inner wall to the outer wall of the oil reserving chamber is 75:25 (Example 2).
Figure 3C:
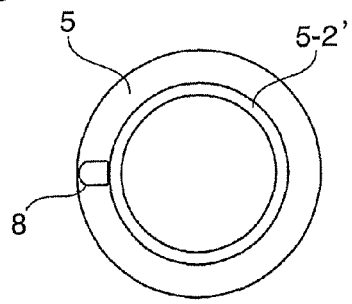
FIG. 3C is a schematic diagram of a conventional example without an eccentric wall when the eccentric ratio of the inner wall to the outer wall of the oil reserving chamber is 50:50.
Figure 4:
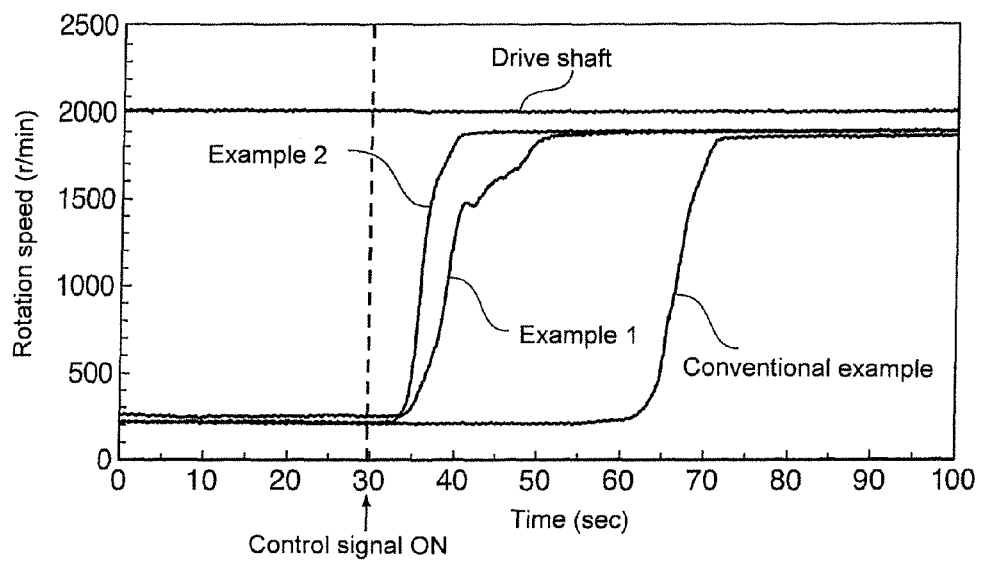
FIG. 4 is a diagram depicting results obtained from studies of reaction rates of fan rotation to a control signal in the embodiment of the present invention.

In the present embodiments, reaction rates when the eccentric ratio of the inner wall to the outer wall of the oil reserving chamber is 60:40 in FIG. 3A (Example 1) and is 75:25 in FIG. 3B (Example 2) are depicted in FIG. 4, compared with a conventional example when the eccentric ratio is 50:50 in FIG. 3C (an inner wall 5-2' that is not eccentric).

As is evident from the results depicted in FIG. 4, when tests were performed with normal OFF rotation (200 rpm to 250 rpm), it took 30 seconds and more to cause a reaction from a time when a control signal is turned ON in the case of the conventional example of 50:50 in FIG. 3C (without an eccentric wall). By contrast, in the case of both 60:40 (Example 1) in FIG. 3A and 75:25 (Example 2) in FIG. 3B of the present invention, a reaction quickly occurred as few as within ten seconds. The reason is as follows. In the conventional example without an eccentric wall, oil is not concentrated near the oil circulating flow passage 8 and the fluid head pressure (supply pressure) is thus weak. By contrast, in Examples 1 and 2 of the present invention, by the effect of the inner wall 5-2 provided in the oil reserving chamber as being eccentric to the outer wall 5-1, the fluid head pressure is intensified to increase the supply amount of oil supplied into the torque transmission chamber 6.

REFERENCE SIGNS LIST 1 rotary shaft (drive shaft)
2 sealed housing
2-1 case
2-2 cover
3 drive disk
4 plate
5 oil reserving chamber
5-1 outer wall
5-2 inner wall that is eccentric
5-2' inner wall that is not eccentric
6 torque transmission chamber
8 oil circulating flow passage hole
8-1 oil recovery port
10 valve member
10-1 leaf spring
10-2 armature
11 fixed portion of valve member
13 bearing
14 bearing
15 bearing
16 electromagnet
17 electromagnet support

What is claimed is:

1. A highly reactive fluid fan clutch device of an external control type, the device comprising:
   a torque transmission chamber incorporating a drive disk therein and provided in a sealed housing composed of a nonmagnetic case and a cover mounted on the case, the case and the cover being supported via bearings on a rotary shaft with the drive disk fixed thereto;
   at least one oil circulating flow passage hole communicating with a torque transmission gap and provided on a side wall of an annular oil reserving chamber formed in the case;
   a magnetic valve member for opening and closing the oil circulating flow passage hole, the valve member having an armature attached to a leaf spring mounted on the case;
   an electromagnet supported via a bearing to the rotary shaft; and
   a ring-shaped magnetic member disposed via a ring-shaped non-magnetic member on an outer periphery of the rotary shaft,
   wherein opening and closing of the oil circulating flow passage hole is controlled by the valve member actuated by the electromagnet, and an effective contact area of oil in the torque transmission gap provided between the drive side and the driven side is increased and decreased to control rotary torque transmission from a drive side to a driven side, and
   wherein the annular oil reserving chamber is formed as a hollow between an annular inner wall and an annular outer wall of the case, the annular inner wall being eccentric with respect to the outer wall of the annular oil reserving chamber.

2. The fluid fan clutch device of claim 1, wherein the annular inner wall of the annular oil reserving chamber is configured eccentrically with respect to the annular outer wall to define a greater radial dimension for the annular oil reserving chamber in proximity to the oil circulating flow passage hole.

* * * * *